(No Model.)
C. W. PEARSALL.
DRAFT REDUCER FOR VEHICLES.
No. 356,955. Patented Feb. 1, 1887.
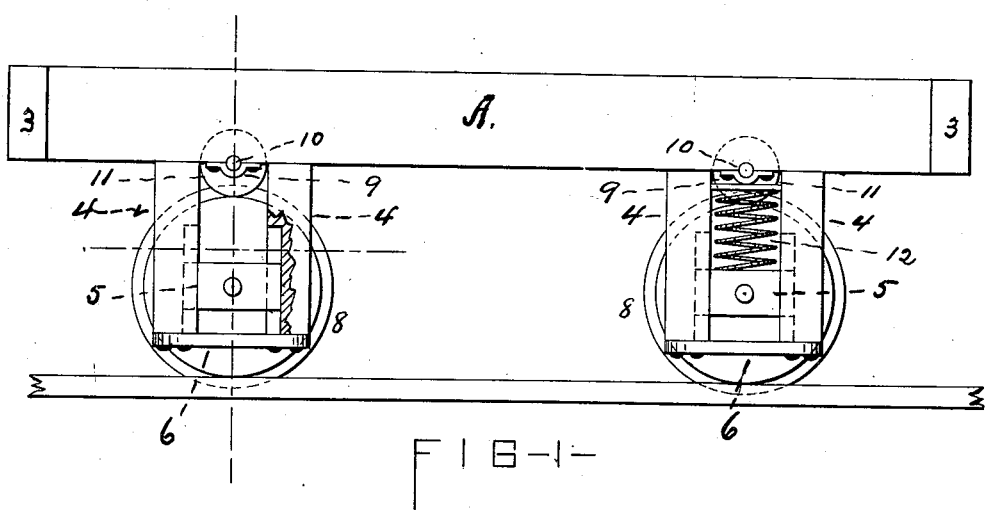
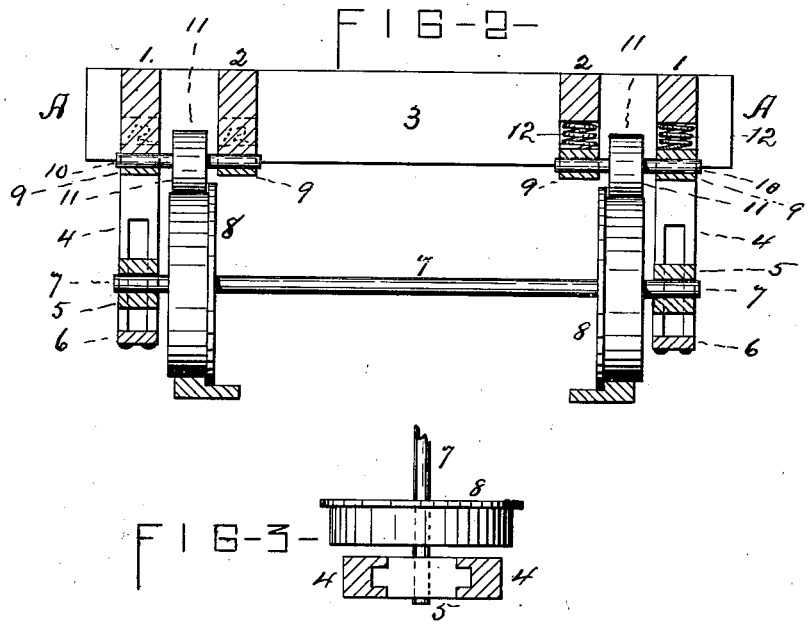
Witnesses —
Inventor —
Chas. W. Pearsall

UNITED STATES PATENT OFFICE.

CHARLES W. PEARSALL, OF SYRACUSE, NEW YORK, ASSIGNOR OF ONE-HALF TO WILLIAM B. KIRK, OF SAME PLACE.

DRAFT-REDUCER FOR VEHICLES.

SPECIFICATION forming part of Letters Patent No. 356,955, dated February 1, 1887.

Application filed November 18, 1886. Serial No. 219,264. (No model.)

*To all whom it may concern:*

Be it known that I, CHARLES W. PEARSALL, of Syracuse, county of Onondaga, in the State of New York, a citizen of the United States, have invented certain new and useful Improvements in Draft-Reducers, of which the following is a specification, reference being had to the accompanying drawings, in which—

Figure 1 is a side elevation thereof. Fig. 2 is a vertical section; Fig. 3, a detail of the box and box-frame.

The object of my invention is to produce an improved device for reducing the amount of draft required to move from a standstill and keep in motion any kind of wheeled vehicle carrying a load; and it consists, in general, of a device for applying the draft-strain to the top of one or all of the main wheels, applying such draft in such a manner as to effect a frictional pull upon the periphery of the main wheel, to which it is applied, at a point which is the farthest from the center of said wheel, and vertically above its axle, such friction being increased by shifting the weight of the vehicle and its load from the main axle or axles to the periphery of the main wheel or wheels.

It is constructed as follows:

A represents the bed-frame of a car, which car is shown to illustrate the principle of my invention, not limiting myself to its application to that class of vehicles alone. In its use upon the car shown it operates as a car-starter as the car is started, and as a draft or friction reducer as soon as the car receives headway. The frame A consists of the side timbers, 1 and 2, and ends 3, and also the box-frames 4 4, secured to the under side of timbers 1. The inner faces of these box-frames are grooved vertically, to receive a tenon on each side of the box 5, so that the box can slide up and down therein. Across the lower ends of these box-frames I also secure a stop-bar, 6, to hold the boxes within the frames. In these boxes 5 I journal the main axles 7, which axles carry the main wheels 8, the wheels and axles being of ordinary construction.

Upon the under side of the side timbers, 1 and 2, I secure journals 9, receiving the supplemental axles 10, upon which I mount the supplemental or, as I term them, the "draft" wheels 11, all being so erected that the peripheries of the draft-wheels rest in close frictional contact with the peripheries of the tread of the main wheels.

It will be observed that the draft-wheels are much smaller than the main wheels.

The draft-wheels rest directly on the tread of the main wheels, and not on any hub or axle carried by these wheels. The weight of the load is removed entirely from the axles of the main wheels, unless it is preferred to support a portion of the weight on springs resting on the movable bearing-boxes of these main wheels, and, also, such weight effects the strongest or maximum frictional contact of the draft-wheels upon the main wheels.

It will be further observed that when strain or draft is applied to either end of the frame A, such draft operates directly upon the periphery of the main wheels and exerts greater pulling-power than if applied to the main axles 7, proportional to the distance such strain is removed from the centers of the main wheels.

As the boxes are free to play somewhat vertically in their frames, I can interpose springs 12 between the boxes and the frame, and can make those springs strong enough to carry the weight of the body of the vehicle and support it in such manner, when empty, as to prevent very much frictional contact of the draft-wheels upon the main wheels; also, the main wheels can be mounted loosely upon the main axles, to permit independent revolution of the wheels in each pair in turning a curve.

I am aware that locomotives have been known in which an auxiliary drive-wheel was supported on a hub on the driver which rested on the track. In such case, however, the auxiliary wheel was not directly over the track, and did not rest on the "tread" of the main wheel.

What I claim as my invention, and desire to secure by Letters Patent, is—

1. In combination with the frame of a vehicle, a main wheel having bearings to admit vertical play in said frame, and a draft-wheel resting on the tread of said main wheel and having its bearings under the frame to support the load, substantially as described.

2. The combination, with the frame of a vehicle, of a main wheel having bearings to permit vertical movement in said frame, a draft-wheel resting on the tread of the main wheel and supporting the frame on its bearings, and relieving-springs interposed between the bearings and the frame, substantially as described.

3. The combination, with the frame A, having box-frame 4, of the main wheels 8, having axle-bearings 5, guided to vertical movement in said box-frame, draft-wheels 11, resting on the tread of the main wheels perpendicularly above their centers and having their bearings in the frame at each side of a perpendicular extension of the main wheel, and springs 12 above the movable bearings of the wheels, all substantially as described.

In witness whereof I have hereunto set my hand this 4th day of November, 1886.

CHAS. W. PEARSALL.

In presence of—
C. W. SMITH,
J. P. RAPAYE.